2,573,981

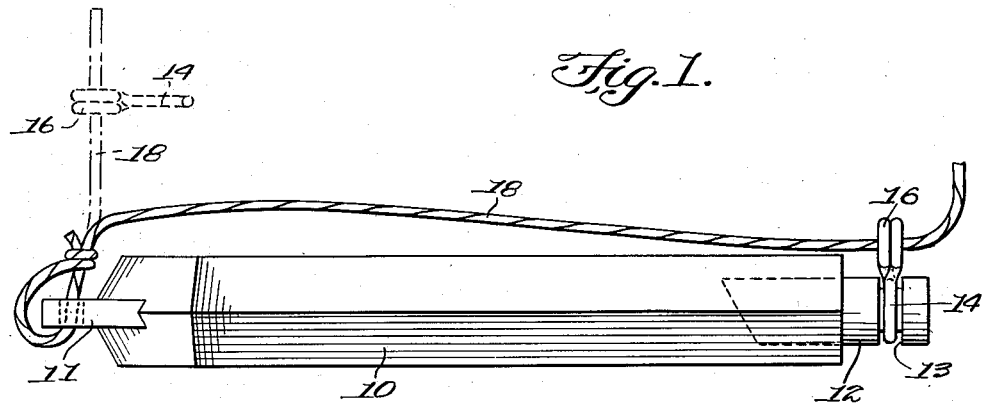
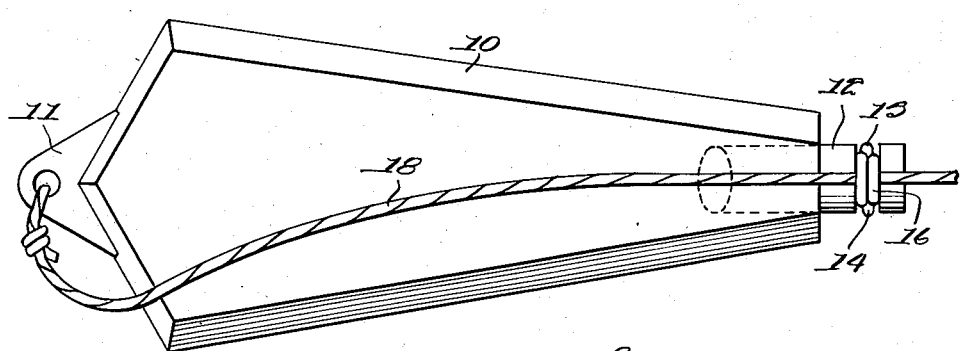
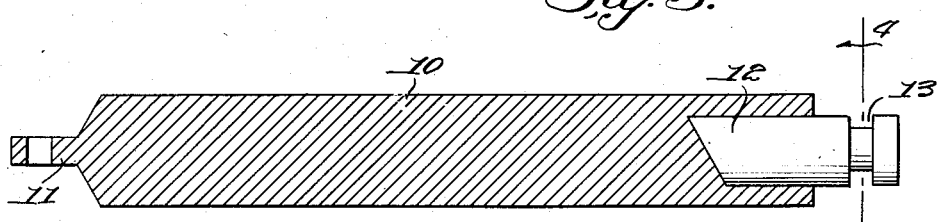
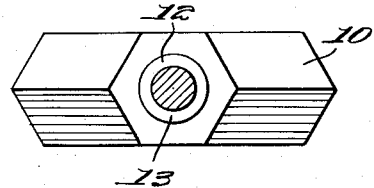
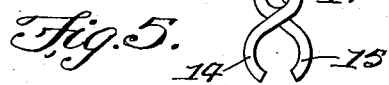
INVENTOR.
Francis W. Nelson,
BY Victor J. Evans & Co.
ATTORNEYS Patented Nov. 6, 1951

UNITED STATES PATENT OFFICE 2,573,981

FISHING LINE TRIP SINKER

Francis W. Nelson, Bronx, N. Y.

Application March 30, 1950, Serial No. 152,827

3 Claims. (Cl. 43—43.1)

This invention relates to fishing tackle and particularly sinkers used on fishing lines, and in particular this invention relates to a sinker having an elongated body with a line attaching eye at one end and a stud having an annular groove therein extended from the opposite end with the groove positioned to receive a spring clip on the fishing line whereby under pressure the spring clip is released from the stud and tension is applied to the opposite end of the sinker by the line.

The purpose of this invention is to prevent losing hooks and sinkers of fishing lines when a sinker catches on a snag.

With a sinker directly connected to a fishing line the line pulls the sinker into a snag and it is substantially impossible to release the sinker by pulling or jerking the line. With this thought in mind this invention contemplates means for attaching the fishing line to the sinker wherein when a sinker is caught in a snag or the like the pull of the line is automatically applied to the opposite end of the sinker whereby the sinker is drawn from the snag without releasing the sinker from the line.

The object of this invention is, therefore, to provide means for constructing a sinker for fishing lines whereby the line is releasably attached to one end of the sinker and permanently attached to the opposite end so that as the sinker strikes a snag the line is released from the end of the sinker to which it is releasably attached whereby the force of the line is applied to the opposite end where the line is permanently attached to the sinker.

Another object of the invention is to provide an improved sinker for fishing lines that may be used on substantially all types of lines.

Another object of the invention is to provide means for reversing the position of a sinker on a line to prevent the line parting when a back lash occurs in casting.

A further object of the invention is to provide an improved sinker for fishing lines wherein the pull of the line may automatically be changed from one end of the sinker to the other and in which the sinker is of a simple and economical construction.

With these and other objects and advantages in view the invention embodies a sinker having an elongated body with a line attaching eye at one end and with a spring clip through which the line extends releasably attached to the opposite end.

Other features and advantages of the invention will appear from the following description taken in connection with the drawing wherein:

Figure 1 is a side elevational view of the sinker showing a fishing line permanently attached to an eye at one end and releasably attached by a spring clip to a stud at the other end.

Figure 2 is a plan view of the sinker as illustrated in Figure 1.

Figure 3 is a longitudinal section through the sinker with the line and spring clip omitted.

Figure 4 is an end view of the sinker taken on line 4—4 of Figure 3 showing the stud in section.

Figure 5 is a detail illustrating the spring clip by which the line is attached to the stud of the sinker.

Referring now to the drawing wherein like reference characters denote corresponding parts the improved sinker for fishing lines of this invention includes a body 10, having an eye 11 extended at one end and a stud 12 with an annular groove 13 therein extended from the opposite end and positioned to receive a spring clip having arcuate fingers 14 and 15 extended from a coil 16.

The coil 16 is provided with an eye 17 through which a line 18 extends, as shown in Figures 1 and 2 and with the line extended through the eye 17 the end thereof is attached to the eye 11 whereby the line extends along the side of the sinker when the fishing line is in use.

With the parts arranged in this manner the sinker is attached to the fishing line as illustrated in Figures 1 and 2 while fishing and should the sinker strike a snag the pull on the line will jerk the spring clip from the groove 13 of the stud 12 whereby the line is released from the end of the sinker carrying the stud and the force of the line is applied to the eye 11 at the opposite end of the sinker. By this means the sinker is pulled backwardly away from the snag so that it is released therefrom without breaking the line and thereby causing the loss of the hooks, sinker, and part of the line.

With the sinker attached to the line in this manner the loss of the sinker due to the line parting when back lash occurs in casting is substantially eliminated as the jerk springs the spring clip from the stud and relieves the shock or excessive load that often causes the line to break.

It will be understood that modifications may be made in the design and arrangement of the parts without departing from the spirit of the invention.

What is claimed is:

1. A fishing line sinker comprising an elongated body having tapering sides with an eye on one end and a stud extended from the other end, the end of said body from which the stud extends being of hexagonal shape and the thickness of the hexagon being extended throughout the length of the body, a fishing line attached to the eye on the end of the body, and a fishing line receiving spring clip releasably mounted on the stud.

2. A fishing line sinker comprising an elongated lead body having an eye on one end and a stud with an annular groove therein extended from the other end, a fishing line attached to the eye on the end of the body and a spring clip having arcuate fingers positioned on the stud with the spring fingers in the groove thereof and having a coil with an eye therethrough for receiving the fishing line with the end of the line attached to the eye on the opposite end of the said elongated body.

3. In a fishing line sinker, the combination which comprises an elongated body having an eye extended from one end and a stud with an annular groove therein extended from the other end with the sides of the body converging from the end on which the eye is positioned to the end in which the stud is positioned, a fishing line attached to the eye extended from one end of the body and a spring clip having a coil providing a fishing line receiving eye with arcuate spring fingers extended from the coil whereby the arcuate spring fingers are releasably mounted on the stud and positioned in the groove therein.

FRANCIS W. NELSON.

REFERENCES CITED

The following references are of record in the file of this patent:

UNITED STATES PATENTS

| Number | Name | Date |
|---|---|---|
| 1,700,332 | Pflueger | Jan. 29, 1929 |
| 2,490,460 | McAvoy | Dec. 6, 1949 |
| 2,497,473 | Slepica | Feb. 14, 1950 |